United States Patent
Jiao et al.

(10) Patent No.: US 10,555,266 B2
(45) Date of Patent: Feb. 4, 2020

(54) TRANSMISSION POWER CONTROL METHOD AND USER EQUIPMENT

(71) Applicant: HYTERA COMMUNICATIONS CORP., LTD., Shenzhen, Guangdong (CN)

(72) Inventors: Fuqiang Jiao, Shenzhen (CN); Zhibing Lu, Shenzhen (CN); Xiaofeng Xin, Shenzhen (CN); Genxing Xiang, Shenzhen (CN); Hong Chen, Shenzhen (CN)

(73) Assignee: Hytera Communications Corporation Limited (CN)

( * ) Notice: Subject to any disclaimer, the term of this patent is extended or adjusted under 35 U.S.C. 154(b) by 27 days.

(21) Appl. No.: 15/822,973

(22) Filed: Nov. 27, 2017

(65) Prior Publication Data
US 2018/0167891 A1  Jun. 14, 2018

(30) Foreign Application Priority Data

Nov. 29, 2016  (CN) .......................... 2016 1 1086469

(51) Int. Cl.
  *H04B 15/00*  (2006.01)
  *H04W 52/24*  (2009.01)
  *H04W 52/08*  (2009.01)
  *H04W 52/02*  (2009.01)

(52) U.S. Cl.
  CPC ..... *H04W 52/242* (2013.01); *H04W 52/0209* (2013.01); *H04W 52/08* (2013.01); *H04W 52/243* (2013.01); *H04W 52/241* (2013.01)

(58) Field of Classification Search
  CPC .......... H04W 52/242; H04W 52/0209; H04W 52/08; H04W 52/243
  See application file for complete search history.

(56) References Cited

U.S. PATENT DOCUMENTS

2005/0277415 A1\* 12/2005 Hamalainen ...... H04W 36/0094
  455/436
2011/0034204 A1\* 2/2011 Sawai ................. H04W 52/243
  455/522

(Continued)

FOREIGN PATENT DOCUMENTS

CN  103118338 A  5/2013

OTHER PUBLICATIONS

Office Action for Chinese Patent Application No. 201611086469.7 dated Sep. 4, 2019.

*Primary Examiner* — Md K Talukder
(74) *Attorney, Agent, or Firm* — Calfee, Halter & Griswold LLP

(57) ABSTRACT

The present invention discloses a transmission power control method and a user equipment. A power reference value adjusted is compared with a maximum transmission power of a channel in a narrowband mode, and a minimum value between the two is selected as the transmission power in the narrowband mode to avoid data from being transmitted by a higher power in the narrowband mode, so as to effectively reduce the interference to data transmission during coexistence of the narrowband mode and a wideband mode, improve the effectiveness of transmission power control in the narrowband mode, and prolong the standby time of the user equipment to the greatest extent.

15 Claims, 4 Drawing Sheets

Acquire a path loss parameter of a channel in a narrowband mode, wherein the narrowband mode is a communication mode of the channel transmitting data through narrowband between a UE and a base station — S11

Select a corresponding power adjustment parameter according to the path loss parameter, and the power adjustment parameter selected is used to adjust a power reference value, wherein different path loss parameters correspond to different power adjustment parameters — S12

Compare the power reference value adjusted with a maximum transmission power of the channel in the narrowband mode, and use a minimum value between the two as the transmission power of the channel in the narrowband mode — S13

(56) References Cited

U.S. PATENT DOCUMENTS

| | | | | |
|---|---|---|---|---|
| 2013/0183904 | A1* | 7/2013 | Hiben | H04W 72/082 |
| | | | | 455/63.1 |
| 2014/0133448 | A1* | 5/2014 | Xu | H04W 52/146 |
| | | | | 370/329 |
| 2015/0319676 | A1* | 11/2015 | Josan | H04W 48/16 |
| | | | | 455/434 |
| 2016/0165547 | A1* | 6/2016 | Ouchi | H04W 52/146 |
| | | | | 455/522 |
| 2016/0337981 | A1* | 11/2016 | Dhakal | H04W 52/242 |
| 2017/0111161 | A1* | 4/2017 | Raggio | H04L 43/16 |
| 2017/0302337 | A1* | 10/2017 | Liu | H04B 7/005 |
| 2018/0069612 | A1* | 3/2018 | Yum | H04L 1/00 |
| 2018/0167891 | A1* | 6/2018 | Jiao | H04W 52/247 |

* cited by examiner

TRANSMISSION POWER CONTROL METHOD AND USER EQUIPMENT

TECHNICAL FIELD

The embodiments of the present invention relate to the field of communications technologies, and in particular, to a transmission power control method and user equipment.

BACKGROUND

A private network trunking communication system is a special communication system with dispatching capability that can provide unidirectional communication capability and allows a UE (User Equipment) to communicate with one or more other UEs. With the increasingly abundant mobile services and the rapid growth of portfolios, texts, pictures, videos, etc. become one of the private network trunked communication contents, and it is difficult for a traditional narrowband trunking system, such as a PDT (Public Digital Trunking) system to meet the current communication demands due to weak data bandwidth capability, poor mobility and other limitations. Based on this, an LTE (Long Term Evolution) technology which has the advantages of strong data bandwidth capability and good mobility has gradually became a development trend of the private network trunking communication system since it can achieve rich trunking services over the public LTE network.

In the process of transitioning the private network trunking communication system from narrowband to wideband, the narrowband system is possibly continued to provide services to customers in a relatively long period, which will result in a situation of coexistence of the wideband system and the narrowband system. Therefore, the integration of the wideband system and the narrowband system in the private network trunking communication system is the trend in a future period. For hardware compatibility, the coexistence of the two different systems on the same hardware needs to be considered, such as realizing the coexistence of a PDT system and an LTE system on the same RRU (Remote Radio Unit) and BBU (Building Baseband Unit), so that the UE can support a narrowband mode and a wideband mode at the same time.

In the process of realizing the narrowband mode and the wideband mode between the UE and a base station, since the current narrowband system does not have a perfect transmission power control mechanism, when data transmission is realized by a higher power, the data transmission may have more serious interference, and even be directly blocked, which will seriously affect the operation of the system. Moreover, since the effectiveness of the transmission power control of the narrowband system is poor, which easily causes the UE to transmit data by an unnecessary power, thereby causing unnecessary waste of the electricity of the UE and reducing the standby time of the UE.

SUMMARY

In view of this, the present invention provides a transmission power control method and a user equipment, which can effectively reduce the interference on the data transmission during coexistence of the narrowband mode and the wideband mode, improve the effectiveness of the transmission power control of the narrowband system, and prolong the standby time of the user equipment to the greatest extent.

A transmission power control method according to an embodiment of the present invention comprises: acquiring a path loss parameter of a channel in a narrowband mode, wherein the narrowband mode is a communication mode of the channel transmitting data through narrowband between a UE and a base station; selecting a corresponding power adjustment parameter according to the path loss parameter, and using the power adjustment parameter selected to adjust a power reference value, wherein different path loss parameters correspond to different power adjustment parameters; and comparing the power reference value adjusted with a maximum transmission power of the channel in the narrowband mode, and using a minimum value between the two as the transmission power of the channel in the narrowband mode.

An UE according to an embodiment of the present invention comprises: a first acquisition module, configured to acquire a path loss parameter of a channel in a narrowband mode, wherein the narrowband mode is a communication mode of the channel transmitting data through narrowband between the UE and a base station; an adjustment module, configured to select a corresponding power adjustment parameter according to the path loss parameter, and use the power adjustment parameter selected to adjust a power reference value, wherein different path loss parameters are corresponding to different power adjustment parameters; and a comparison module, configured to compare the power reference value adjusted with a maximum transmission power of the channel in the narrowband mode, and use a minimum value between the two as the transmission power of the channel in the narrowband mode.

A UE according to another embodiment of the present invention comprises a memory, a processor and a communication bus, wherein the memory is configured to store program instructions, and the processor invokes the program instructions from the memory via the communication bus, and is configured to: execute the program instructions to acquire a path loss parameter of a channel in a narrowband mode, wherein the narrowband mode is a communication mode of the channel transmitting data through narrowband between the UE and a base station; execute the program instructions to select a corresponding power adjustment parameter according to the path loss parameter, and use the power adjustment parameter selected to adjust a power reference value, wherein different path loss parameters correspond to different power adjustment parameters; and execute the program instructions to compare the power reference value adjusted with a maximum transmission power of the channel in the narrowband mode, and use a minimum value between the two as the transmission power of the channel in the narrowband mode.

Different from the prior art, and in the embodiments of the present invention, the adjusted power reference value is compared with the maximum transmission power of the channel in the narrowband mode, and the minimum value is selected as the transmission power in the narrowband mode to avoid data from being transmitted by a higher power in the narrowband mode, so as to effectively reduce the interference to data transmission during coexistence of the narrowband mode and the wideband mode, improve the effectiveness of transmission power control, and prolong the standby time of the user equipment to the greatest extent.

DETAILED DESCRIPTION

The technical solutions of the various exemplary embodiments provided by the present invention will be clearly and completely described below with reference to the accompanying drawings in the embodiments of the present invention. It should be noted that, in case of no conflict, the following embodiments and the features in the embodiments may be mutually combined with each other.

Figure 1:
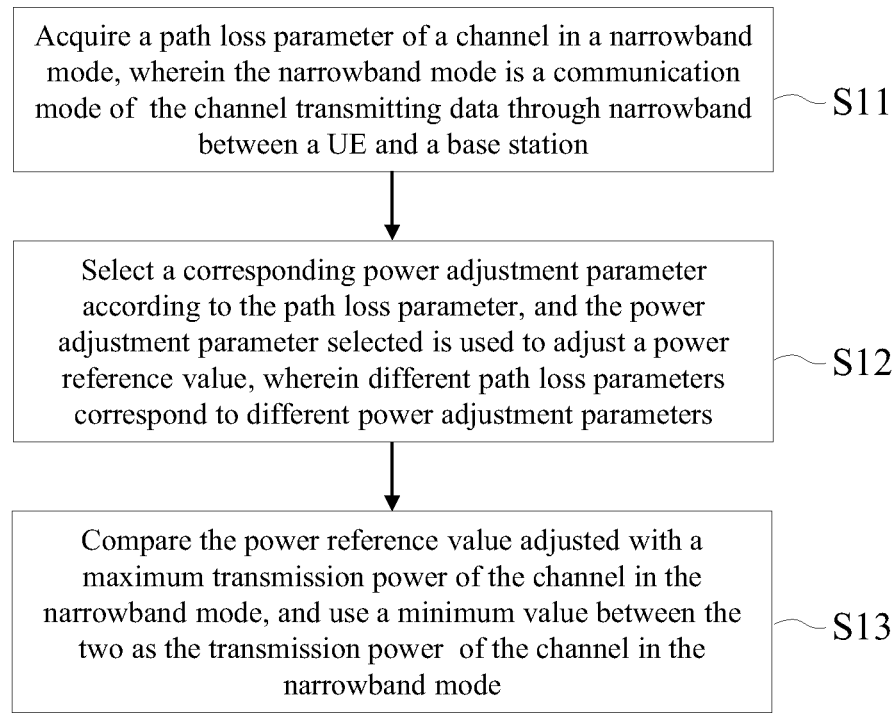
FIG. 1 is a flow diagram of a transmission power control method according to a first embodiment of the present invention.

FIG. 1 shows a transmission power control method according to a first embodiment of the present invention. The transmission power control method may comprise steps S11, S12 and S13.

In S11, a path loss parameter of a channel in a narrowband mode is acquired, wherein the narrowband mode is a communication mode of the channel transmitting data through narrowband between a UE and a base station.

In S12, a corresponding power adjustment parameter is selected according to the path loss parameter, and the power adjustment parameter selected is used to adjust a power reference value, wherein different path loss parameters correspond to different power adjustment parameters.

In S13, the power reference value adjusted is compared with a maximum transmission power of the channel in the narrowband mode, and a minimum value between the two is used as the transmission power of the channel in the narrowband mode.

Figure 2:
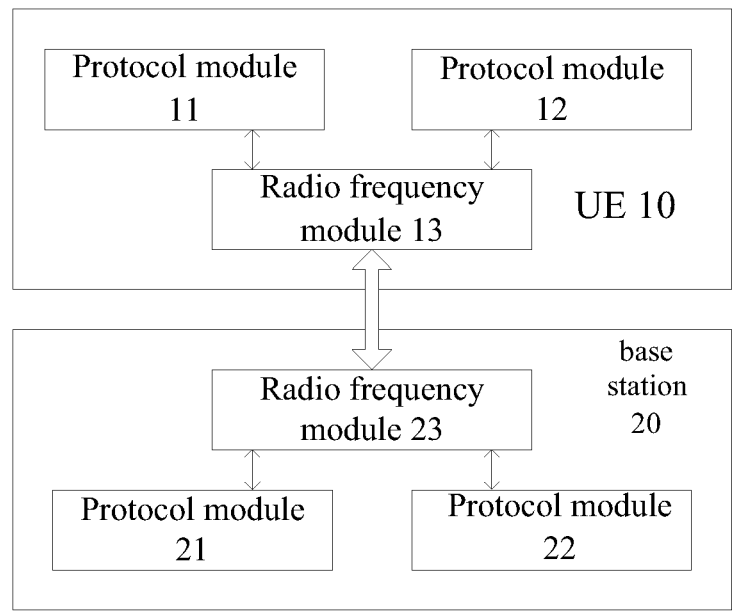
FIG. 2 is a schematic diagram of a module of a UE communicated with a base station according to one embodiment of the present invention.

As shown in FIG. 2, a UE 10 comprises at least two protocol modules 11 and 12, and a radio frequency module 13 shared by the at least two protocol modules 11 and 12. A base station 20 comprises at least two protocol modules 21 and 22, and a radio frequency module 23 shared by the at least two protocol modules 21 and 22. The protocol modules of the UE 10 and the base station 20 are respectively responsible for data processing required by various transfer protocol standards, and the radio frequency modules 13 and 23 are responsible for converting a baseband signal into a radio frequency signal. When the UE 10 and the base station 20 support both a narrowband mode and a wideband mode at the same time, and use the same frequency band to transmit data, channels of the radio frequency modules 13 and 23 can be shared by the two modes.

When the UE 10 and the base station 20 are transmitting data, a transmission signal power is mainly affected by path loss, shadow fading and multipath fading, i.e., the path loss parameter is mainly affected by a signal frequency, a transmission distance and an environment, which is as shown in a formula 1-1 below:

$$P_L = 10a*\log_{10}d + 10b*\log_{10}f_c + 10c*\log_{10}h_t + 10d*\log_{10}h_r + x \ldots \quad 1\text{-}1$$

wherein, a, b, c and d respectively refer to loss index factors of a path, a frequency, a sending antenna and a receiving antenna for performing data transmission, and x refers to a modified formula. Moreover, values of the loss index factors are different when the UE 10 and the base station 20 are disposed in different environments.

When the UE 10 and the base station 20 support the narrowband mode and the wideband mode at the same time, and use the same frequency band to transmit data, it can be deemed that the wideband mode and the narrowband mode have the same path loss since the positions of the UE 10 and the base station 20 in the two modes are kept unchanged. Based on this, the path loss parameter in the wideband mode can be acquired in the embodiment, and used as the path loss parameter in the narrowband mode to be acquired in step S11.

The principle and process of acquiring the path loss parameter in the wideband mode may be: The UE 10 calculates a difference between a reference signal power (reference signal Transmit Energy per Resource Element, RS EPRE) in an SIB (System Information Block) broadcast message issued by the base station 20 and an actually measured reference signal power, i.e., a path loss parameter transmitted in downlink. Because uplink transmission and downlink transmission path losses in an LTE system are the same, the difference is the path loss parameter in the wideband mode.

In the embodiment, the transmission power control comprises open loop control and closed loop control; therefore, the power adjustment parameter for adjusting the power reference value in step S12 are different according to the different control modes.

Figure 3:
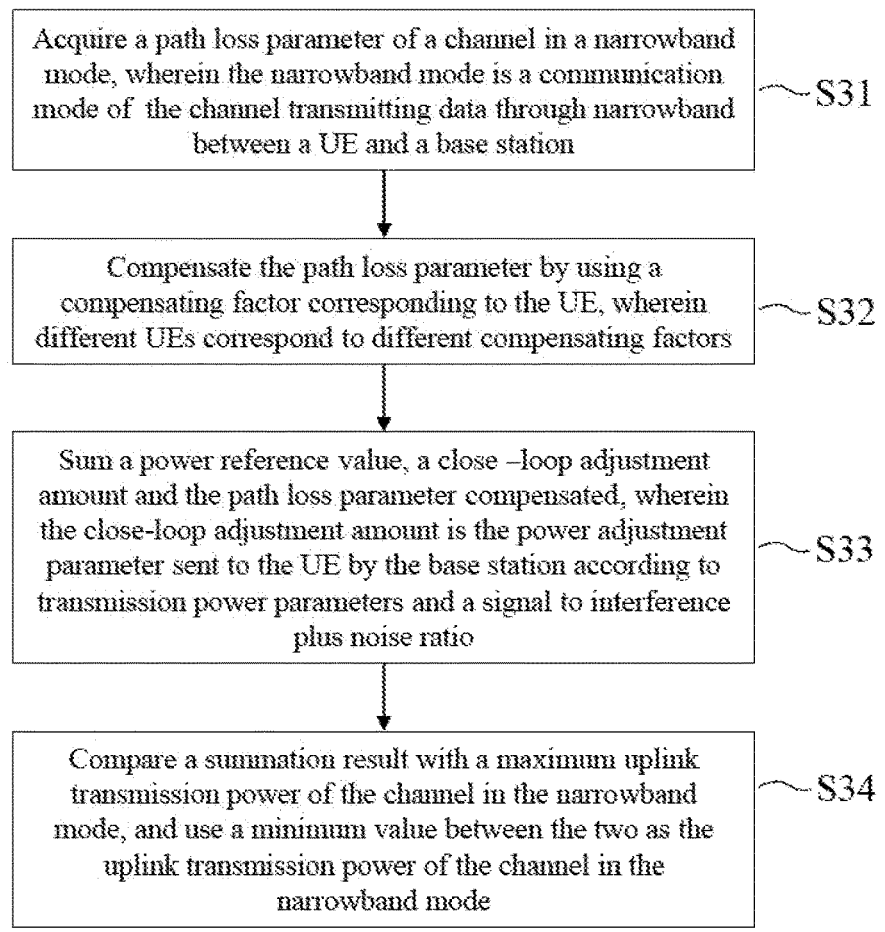
FIG. 3 is a flow diagram of a transmission power control method according to a second embodiment of the present invention.

FIG. 3 shows a transmission power closed loop control method according to one embodiment of the present invention. The transmission power closed loop control method may comprise steps S31 to S34, wherein steps S32 and S33 are specific manners to select a corresponding power adjustment parameter according to path loss parameter, and use the power adjustment parameter selected to adjust a power reference value.

In S31, a path loss parameter of a channel in a narrowband mode is acquired, wherein the narrowband mode is a communication mode of the channel transmitting data through narrowband between a UE and a base station.

In S32, the path loss parameter is compensated by using a compensating factor corresponding to the UE, wherein different UEs correspond to different compensating factors.

In S33, the power reference value, a close-loop adjustment amount and the path loss parameter compensated are summed, wherein the close-loop adjustment amount is the power adjustment parameter sent to the UE by the base station according to transmission power parameters and a signal to interference plus noise ratio.

In S34, a summation result is compared with a maximum transmission power of the channel in the narrowband mode, and a minimum value between the two is used as the transmission power of the channel in the narrowband mode.

Figure 4:
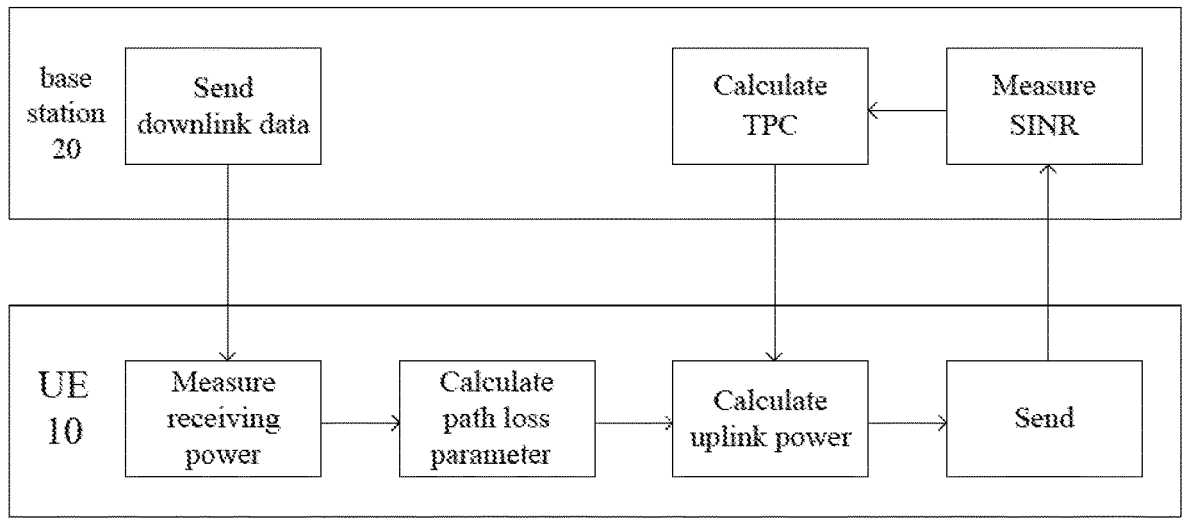
FIG. 4 is a schematic diagram of a module of a UE communicated with a base station according to another embodiment of the present invention.

As shown in FIG. 4, the so-called transmission power closed loop control is that the base station 20 takes the path loss parameter acquired by the UE 10 into the transmission power consideration. In the embodiment, the base station 20 is configured with a TPC (Transmission Power Control) calculation and/or SINR (Signal to Interference plus Noise Ratio) measurement function.

The closed loop control method of the embodiment can be represented by a relational expression below:

$$P=\min\{P_{MAX}, P_0+\alpha*P_L+g(i)\} \ldots \quad 1\text{-}2$$

wherein, P represents the transmission power in the narrowband mode, $P_{MAX}$ represents the maximum transmission power of a narrowband channel, $P_0$ represents the power reference value, $\alpha$ represents the compensating factor, the value range of a is {0, 0.4, 0.5, 0.6, 0.7, 0.8, 0.9, 1}, $P_L$ represents the path loss parameter, g(i) represents the close-loop adjustment amount, $g(i)=g(i-1)+\rho$, $\rho$ is the power adjustment parameter in the SIB broadcast message issued by the base station 20 to the UE 10 according to the transmission power parameter and the signal to interference plus noise ratio.

The manner of acquiring the power reference value $P_0$ in the embodiment may be: compensating the target signal to interference plus noise ratio and a noise power of the channel in the narrowband mode by using the compensation factor corresponding to the UE 10; summing the maximum transmission power $P_{MAX}$ of the channel in the narrowband mode, the target signal to interference plus noise ratio and the noise power compensated; further, compensating the maximum transmission power $P_{MAX}$ of the channel in the narrowband mode by using the compensation factor; and calculating a difference between a summation result and the maximum transmission power compensated, and using the difference as the power reference value $P_0$.

It is embodied in a relational expression below:

$$P_0=\alpha*(\text{SINR}_0+P_0)+(1-\alpha)*P_{MAX} \ldots \quad 1\text{-}3$$

wherein, $\text{SINR}_0$ represents the target signal to interference plus noise ratio, and $P_0$ represents the noise power of a narrowband channel. It is apparent that the power reference value $P_0$ is proportional to the target signal to interference plus noise ratio $\text{SINR}_0$ and the noise power $P_0$.

Figure 5:
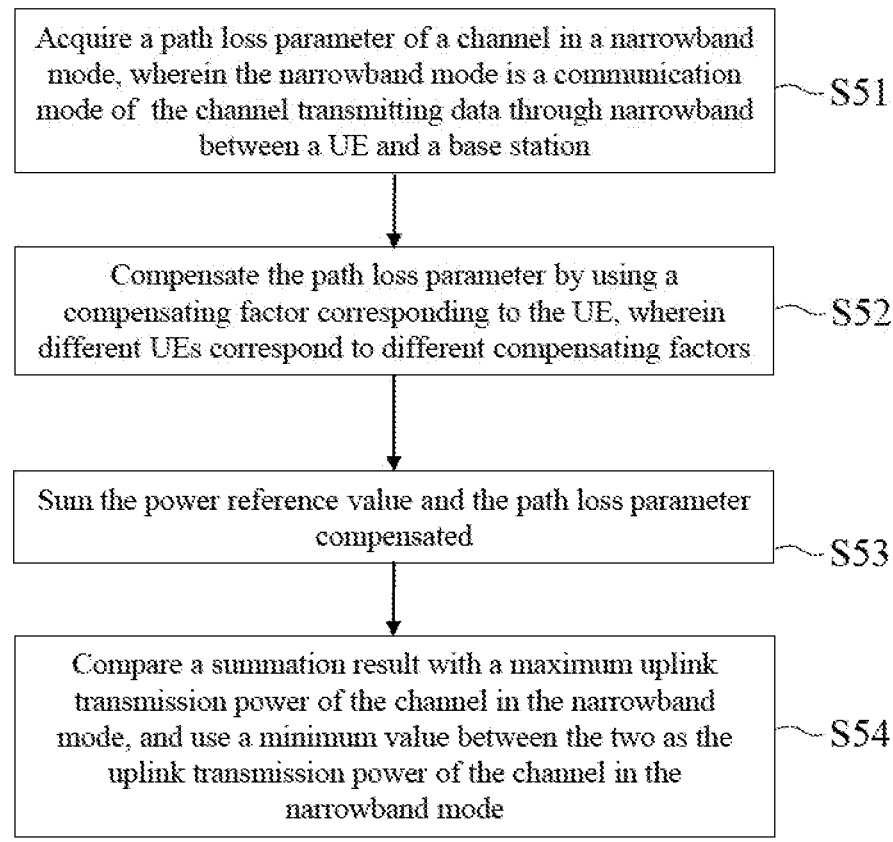
FIG. 5 is a flow diagram of a transmission power control method according to a third embodiment of the present invention.

FIG. 5 shows a transmission power open loop control method according to one embodiment of the present invention. The transmission power open loop control method may comprise steps S51 to S54, wherein steps S52 and S53 are specific manners to select a corresponding power adjustment parameter according to a path loss parameter, and use the power adjustment parameter selected to adjust a power reference value.

In S51, a path loss parameter of a channel in a narrowband mode is acquired, wherein the narrowband mode is a communication mode of the channel transmitting data through narrowband between a UE and a base station.

In S52, the path loss parameter is compensated by using a compensating factor corresponding to the UE, wherein different UEs are corresponding to different compensating factors.

In S53, the power reference value and the path loss parameter compensated are summed.

In S54, a summation result is compared with a maximum transmission power of the channel in the narrowband mode, and a minimum value between the two is used as the transmission power of the channel in the narrowband mode.

As shown in FIG. 4, the so-called transmission power open loop control is that the base station 20 does not take the path loss parameter acquired by the UE 10 into the transmission power consideration. In the embodiment, the base station 20 does not need to be configured with a TPC (Transmission Power Control) calculation module and/or SINR (Signal to Interference plus Noise Ratio) measurement module.

The open loop control method of the embodiment can be represented by a relational expression below:

$$P=\min\{P_{MAX}, P_0+\alpha*P_L\} \ldots \quad 1\text{-}4$$

comparing with the closed loop control method, g(i)=0 in the embodiment.

The manner of acquiring the power reference value $P_0$ in the embodiment can be referred to the above-mentioned closed loop control method.

In the embodiment, the power reference value adjusted is compared with the maximum transmission power of the channel in the narrowband mode, and the minimum value is selected as the transmission power in the narrowband mode, which can avoid uplink data or downlink data from being transmitted by a higher power in the narrowband mode, so as to effectively reduce the interference of the higher transmission power to data transmission, improve the effectiveness of transmission power control, and prolong the standby time of the user equipment to the greatest extent.

Figure 6:
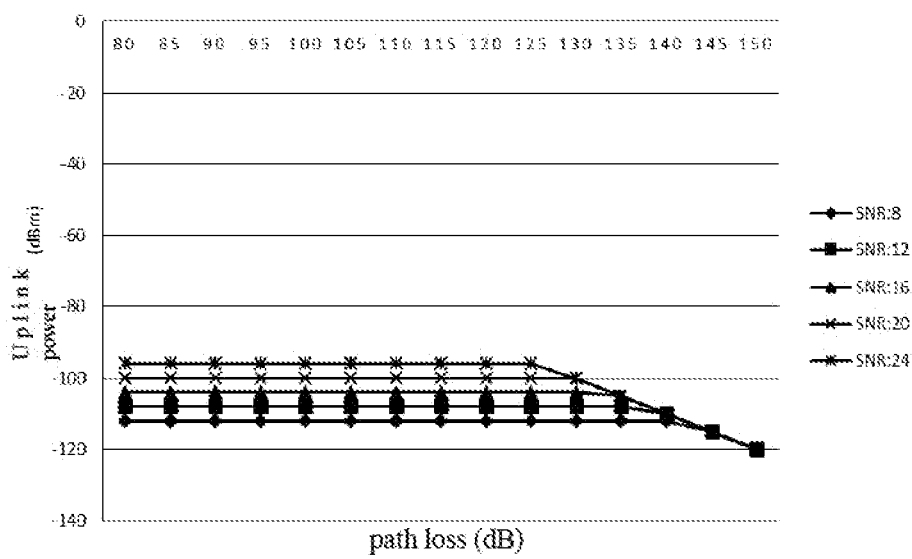
FIG. 6 is a schematic diagram of an open loop control effect of the present invention based on different target signal to interference plus noise ratios and the same compensating factor.
Figure 7:
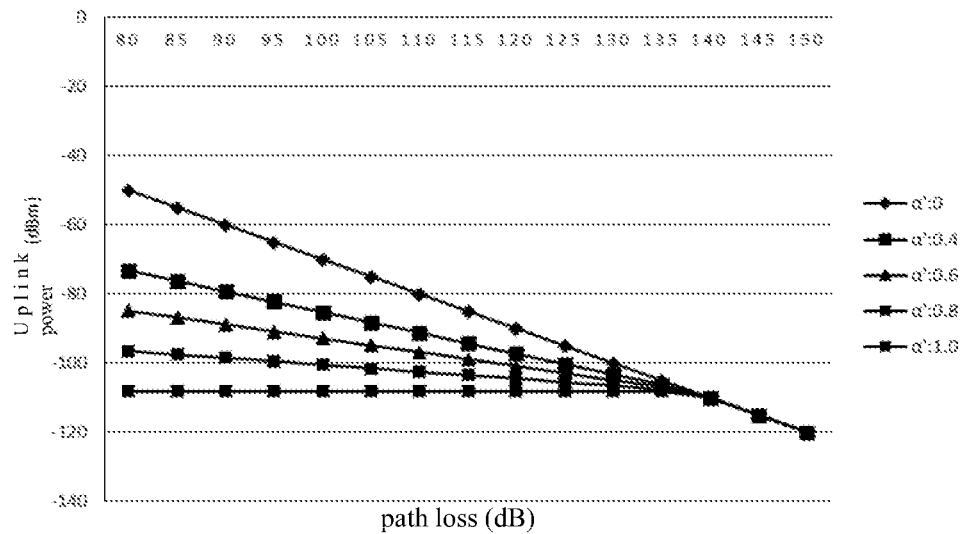
FIG. 7 is a schematic diagram of an open loop control effect of the present invention based on the same target signal to interference plus noise ratio and different compensating factors.

Taking the UE 10 and the base station 20 supporting a PDT system and an LTE system for example, protocol modules 11 and 12 are respectively a PDT protocol module and an LTE protocol module, and protocol modules 21 and 22 are respectively a PDT protocol module and an LTE protocol module. If a maximum uplink power of the channel in the narrowband mode is 30 dBm (i.e., $P_{MAX}$=30 dBm), and the noise power of the channel in the narrowband mode is −120 dBm, (i.e., $P_n$=−120 dBm), as shown in FIG. 6 which shows the open loop control effect based on different target signal to interference plus noise ratios $\text{SINR}_0$, the value of the compensating factor $\alpha$ at this moment is 1; as shown in FIG. 7 which shows the open loop control effect based on different compensating factors $\alpha$, the value of the target signal to interference plus noise ratio $\text{SINR}_0$ at this moment is 12 dB. It is apparent that uplink data can be transmitted at a lower uplink power in the embodiment under the circumstance of achieving different target signal to interference plus noise ratios when the value of the compensating factor is constant and for different compensating factors $\alpha$ when the value of the target signal to interference plus noise ratio is constant.

It should be noted that the foregoing is only the transmission power control method in the narrowband mode according to the embodiment of the present invention, which is only used for avoiding data from being transmitted at a higher transmission power in the narrowband mode. A transmission power control method in the wideband mode can be referred to the existing LTE technology. Specifically, the transmission power control method in the wideband mode can be shown as a relational expression below:

$$P_2=\min\{P_{MAX2}, 10 \log_{10}(M)+P_{02}+\alpha_2*P_{L2}+\Delta TF+f(i)\} \ldots \quad 1\text{-}5$$

wherein, $P_2$ represents a transmission power in the wideband mode, $P_{MAX2}$ represents a maximum transmission power of a wideband channel, M represents the number of physical resource blocks (Physical Resource Block, PRB) assigned by the base station 20 to the UE 10, $P_{02}$ represents a power reference value, $\alpha_2$ represents a compensating factor, the value range of $\alpha_2$ is {0, 0.4, 0.5, 0.6, 0.7, 0.8, 0.9, 1}, $P_{L2}$ represents path loss parameter, f(i) represents the close-loop adjustment amount, f(i)=0 during the transmission power open loop control in the wideband mode, and the f(i) can be obtained by the power adjustment parameter in the SIB broadcast message issued by the base station 20 to the UE 10 according to the transmission power parameter and the signal to interference plus noise ratio.

Figure 8:
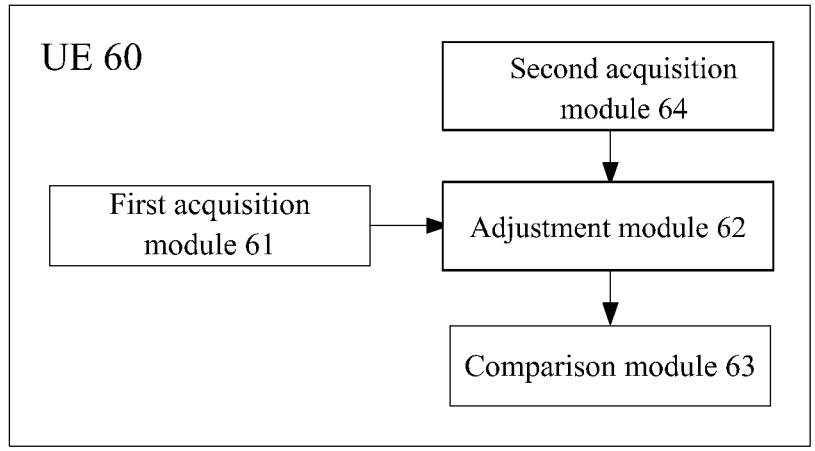
FIG. 8 is a schematic block diagram of a UE according to one embodiment of the present invention.

FIG. 8 is a schematic block diagram of a UE according to one embodiment of the present invention. The UE 60 includes a first acquisition module 61, an adjustment module 62 and a comparison module 63. The first acquisition module 61 is configured to acquire a path loss parameter of a channel in a narrowband mode, wherein the narrowband mode is a communication mode of the channel transmitting data through narrowband between the UE 60 and a base station. The adjustment module 62 is configured to select a corresponding power adjustment parameter according to the path loss parameter, and use the power adjustment parameter selected to adjust a power reference value, wherein different path loss parameters are corresponding to different power adjustment parameters. The comparison module 63 is configured to compare the power reference value adjusted with a maximum transmission power of the channel in the narrowband mode, and use a minimum value between the two as the transmission power of the channel in the narrowband mode.

Optionally, the first acquisition module 61 acquires the path loss parameter of the channel in a wideband mode, and uses the path loss parameter as the path loss parameter of the channel in the narrowband mode, wherein the wideband mode is a communication mode of the channel transmitting data through wideband; or, calculates a difference between a transmission power of the base station and a transmission power actually measured by the UE 60, and uses the difference as the path loss parameter of the channel in the narrowband mode.

For transmission power closed loop control, optionally, the adjustment module 62 compensates the path loss parameter by using a compensating factor corresponding to the UE 60, wherein different UEs 60 are corresponding to different compensating factors; and further, sums the power reference value, a close-loop adjustment amount and the path loss parameter compensated, wherein the close-loop adjustment amount is the power adjustment parameter sent to the UE 60 by the base station according to transmission power parameter and a signal to interference plus noise ratio. A summation result is the power reference value adjusted.

For transmission power open loop control, optionally, the adjustment module 62 compensates the path loss parameter by using a compensating factor corresponding to the UE 60, wherein different UEs 60 correspond to different compensating factors; and further, sums the power reference value and the path loss parameter compensated. A summation result is the power reference value adjusted.

Optionally, the UE 60 further includes a second acquisition module 64, configured to compensate the target signal to interference plus noise ratio and a noise power of the channel in the narrowband mode by using the compensation factor, and compensate a maximum transmission power of the channel in the narrowband mode by using the compensation factor; and further, sum the maximum transmission power of the channel in the narrowband mode, the target signal to interference plus noise ratio and the noise power compensated, and calculate a difference between a summation result and the maximum transmission power compensated, and use the difference as the power reference value.

The above modules of the UE 60 in the embodiment correspondingly execute the above transmission power control method of each embodiment. Those skilled in the art may know that each structural element thereof correspondingly executes each step of the method and achieve the same beneficial effects as that of the method, which will not be elaborated herein.

It should be understood that the division of the above modules is a division of logical function, another division manner may be provided during actual implementation, for example, two modules can be integrated into another system with some of the features being ignored, or without being executed. In addition, the modules can be mutually connected via some interfaces, which can be connected electrically or connected by other forms. The above modules may be implemented in the form of software functional blocks or in the form of hardware as shown in FIG. 9.

Figure 9:
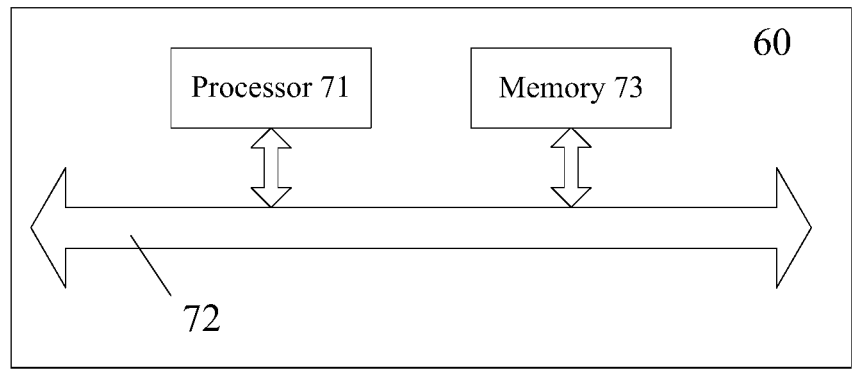
FIG. 9 is a hardware structural schematic diagram of a UE according to one embodiment of the present invention.

Referring to FIG. 9, the UE 60 comprises at least one processor 71, at least one communication bus 72 and a memory 73. To facilitate explanation, the number of the processor 71, the communication bus 72, and the memory 73 as shown in FIG. 9 is one, respectively. The memory 73 is configured to storage program instructions. The communication bus 72 is configured to connect the memory 73 and the processor 71. The processor 71 invokes the program instructions from the memory 73 via the communication bus 72, and is configured to:

execute the program instructions to acquire a path loss parameter of a channel in a narrowband mode, wherein the narrowband mode is a communication mode of the channel transmitting data through narrowband between the UE 60 and a base station;

execute the program instructions to select a corresponding power adjustment parameter according to the path loss parameter, and use the power adjustment parameter selected to adjust a power reference value, wherein different path loss parameters are corresponding to different power adjustment parameters; and execute the program instructions to compare the power reference value adjusted with a maximum transmission power of the channel in the narrowband mode, and use a minimum value between the two as the transmission power of the channel in the narrowband mode.

Optionally, the processor 71 executes the program instructions to acquire the path loss parameter of the channel in a wideband mode, and use the path loss parameter as the path loss parameter of the channel in the narrowband mode, wherein the wideband mode is a communication mode of the channel transmitting data through wideband; or, executes the program instructions to calculate a difference between a transmission power of the base station and a transmission power actually measured by the processor 71, and use the difference as the path loss parameter of the channel in the narrowband mode.

For transmission power closed loop control, optionally, the processor 71 executes the program instructions to compensate the path loss parameter by using a compensating factor corresponding to the UE 60, wherein different UEs correspond to different compensating factors; and further, sum the power reference value, a close-loop adjustment amount and the path loss parameter compensated, wherein the close-loop adjustment amount is the power adjustment parameter sent to the UE 60 by the base station according to transmission power parameters and a signal to interference plus noise ratio. A summation result is the power reference value adjusted.

For transmission power open loop control, optionally, the processor 71 executes the program instructions to compensate the path loss parameter by using a compensating factor corresponding to the UE 60, wherein different UEs 60 are corresponding to different compensating factors; and further, sum the power reference value and the path loss parameter compensated. A summation result is the power reference value adjusted.

Optionally, the processor 71 is also configured to execute the program instructions to compensate the target signal to interference plus noise ratio and a noise power of the channel in the narrowband mode by using the compensation factor, and compensate a maximum transmission power of the channel in the narrowband mode by using the compensation factor; and further, sum the maximum transmission power of the channel in the narrowband mode, the target signal to interference plus noise ratio and the noise power compensated, and calculate a difference between a summation result and the maximum transmission power compensated, and use the difference as the power reference value.

When the foregoing functions of the embodiments of the present invention are implemented in a form of a software function unit and are sold or used as an independent product, they may be stored in a computer-readable storage medium, i.e., the embodiments of the present invention may be embodied in the form of a software product which comprises a number of instructions such that a computer device (which may be a personal computer, a server, a network device, etc.) performs all or a part of steps of the method described in each of the embodiments of the present invention.

The foregoing descriptions are merely embodiments of the present invention, but are not intended to limit the patent scope of the present invention. All equivalent structures or equivalent flow transformations made using the description of the present invention and the accompanying drawings, for example, the mutual combination of the technical features of each embodiment, or being used directly or indirectly in other related technical fields, are similarly included in the protection scope of the present invention.

The invention claimed is:

1. A transmission power control method, comprising:
   acquiring a path loss parameter of a channel in a narrowband mode, wherein the narrowband mode is a communication mode of the channel transmitting data through narrowband between a user equipment UE and a base station;
   selecting a corresponding power adjustment parameter according to the path loss parameter, and using the power adjustment parameter selected to adjust a power reference value, wherein different path loss parameters correspond to different power adjustment parameters; and
   comparing the power reference value adjusted with a maximum transmission power of the channel in the narrowband mode, and using a minimum value selected from the power reference value adjusted and the maximum transmission power of the channel in the narrowband mode as the transmission power of the channel in the narrowband mode.

2. The method according to claim 1, wherein the acquiring a path loss parameter of a channel in a narrowband mode comprises:
   acquiring the path loss parameter of the channel in a wideband mode, and using the path loss parameter as the path loss parameter of the channel in the narrowband mode, wherein the wideband mode is a communication mode of the channel transmitting data through wideband;
   or, calculating a difference between a downlink power of the base station and a downlink power actually measured by the UE, and using the difference as the path loss parameter of the channel in the narrowband mode.

3. The method according to claim 1, wherein:
   the selecting a corresponding power adjustment parameter according to the path loss parameter, and using the power adjustment parameter selected to adjust a power reference value comprises:
   compensating the path loss parameter by using a compensating factor corresponding to the UE, wherein different UEs correspond to different compensating factors; and
   summing the power reference value, a close-loop adjustment amount and the path loss parameter compensated, wherein the close-loop adjustment amount is the power adjustment parameter sent to the UE by the base station according to transmission power parameters and a signal to interference plus noise ratio.

4. The method according to claim 1, wherein:
   the selecting a corresponding power adjustment parameter according to the path loss parameter, and using the power adjustment parameter selected to adjust a power reference value comprises:
   compensating the path loss parameter by using a compensating factor corresponding to the UE, wherein different UEs correspond to different compensating factors; and
   summing the power reference value and the path loss parameter compensated.

5. The method according to claim 3 or 4, wherein the method further comprises:
   compensating the target signal to interference plus noise ratio and a noise power of the channel in the narrowband mode by using the compensation factor;
   summing a maximum transmission power of the channel in the narrowband mode, the target signal to interference plus noise ratio and the noise power compensated;
   compensating the maximum transmission power of the channel in the narrowband mode by using the compensation factor; and
   calculating a difference between a summation result and the maximum transmission power compensated, and using the difference as the power reference value.

6. A user equipment UE, wherein the UE comprises:
   a first acquisition module, configured to acquire a path loss parameter of a channel in a narrowband mode, wherein the narrowband mode is a communication mode of the channel transmitting data through narrowband between the UE and a base station;
   an adjustment module, configured to select a corresponding power adjustment parameter according to the path loss parameter, and use the power adjustment parameter selected to adjust a power reference value, wherein different path loss parameters are corresponding to different power adjustment parameters; and
   a comparison module, configured to compare the power reference value adjusted with a maximum transmission power of the channel in the narrowband mode, and use a minimum value selected from the power reference value adjusted and the maximum transmission power of the channel in the narrowband mode as the transmission power of the channel in the narrowband mode.

7. The UE according to claim 6, wherein the first acquisition module acquires the path loss parameter of the channel in a wideband mode, and uses the path loss parameter as the path loss parameter of the channel in the narrowband mode, wherein the wideband mode is a communication mode of the channel transmitting data through wideband; or, calculates a difference between a downlink power of the base station and a downlink power actually measured by the UE, and uses the difference as the path loss parameter of the channel in the narrowband mode.

8. The UE according to claim 6, wherein the adjustment module compensates the path loss parameter by using a compensating factor corresponding to the UE, wherein different UEs correspond to different compensating factors; and further, sums the power reference value, a close-loop adjustment amount and the path loss parameter compensated, wherein the close-loop adjustment amount is the power adjustment parameter sent to the UE by the base station according to transmission power parameters and a signal to interference plus noise ratio.

9. The UE according to claim 6, wherein the adjustment module compensates the path loss parameter by using a compensating factor corresponding to the UE, wherein different UEs correspond to different compensating factors; and further, sum the power reference value and the path loss parameter compensated.

10. The UE according to claim 8 or 9, wherein the UE further comprises a second acquisition module, configured to compensate the target signal to interference plus noise ratio and a noise power of the channel in the narrowband mode by using the compensation factor, and compensate a maximum transmission power of the channel in the narrowband mode by using the compensation factor; and further, sum the maximum transmission power of the channel in the narrowband mode, the target signal to interference plus noise ratio and the noise power compensated, and calculate a difference between a summation result and the maximum transmission power compensated, and use the difference as the power reference value.

11. A UE, wherein the UE comprises a memory, a processor and a communication bus, the memory is configured to store program instructions, and the processor invokes the program instructions from the memory via the communication bus, and is configured to:
  execute the program instructions to acquire a path loss parameter of a channel in a narrowband mode, wherein the narrowband mode is a communication mode of the channel transmitting data through narrowband between the UE and a base station;
  execute the program instructions to select a corresponding power adjustment parameter according to the path loss parameter, and use the power adjustment parameter selected to adjust a power reference value, wherein different path loss parameters correspond to different power adjustment parameters; and
  execute the program instructions to compare the power reference value adjusted with a maximum transmission power of the channel in the narrowband mode, and use a minimum value selected from the power reference value adjusted and the maximum transmission power of the channel in the narrowband mode as the transmission power of the channel in the narrowband mode.

12. The UE according to claim 11, wherein the processor executes the program instructions to acquire the path loss parameter of the channel in a wideband mode via the communication bus, and use the path loss parameter as the path loss parameter of the channel in the narrowband mode, wherein the wideband mode is a communication mode of the channel transmitting data through wideband; or, calculate a difference between a downlink power of the base station and a downlink power actually measured by the UE, and use the difference as the path loss parameter of the channel in the narrowband mode.

13. The UE according to claim 11, wherein the processor executes the program instructions to compensate the path loss parameter by using a compensating factor corresponding to the UE, wherein different UEs are corresponding to different compensating factors; and further, sum the power reference value, a close-loop adjustment amount and the path loss parameter compensated, wherein the close-loop adjustment amount is the power adjustment parameter sent to the UE by the base station according to transmission power parameters and a signal to interference plus noise ratio.

14. The UE according to claim 11, wherein the processor executes the program instructions to compensate the path loss parameter by using a compensating factor corresponding to the UE, wherein different UEs correspond to different compensating factors; and further, sum the power reference value and the path loss parameter compensated.

15. The UE according to claim 13 or 14, wherein the processor is also configured to execute the program instructions to compensate the target signal to interference plus noise ratio and a noise power of the channel in the narrowband mode by using the compensation factor, and compensate a maximum transmission power of the channel in the narrowband mode by using the compensation factor; and further, sum the maximum transmission power of the channel in the narrowband mode, the target signal to interference plus noise ratio and the noise power compensated, and calculate a difference between a summation result and the maximum transmission power compensated, and use the difference as the power reference value.

* * * * *